UNITED STATES PATENT OFFICE.

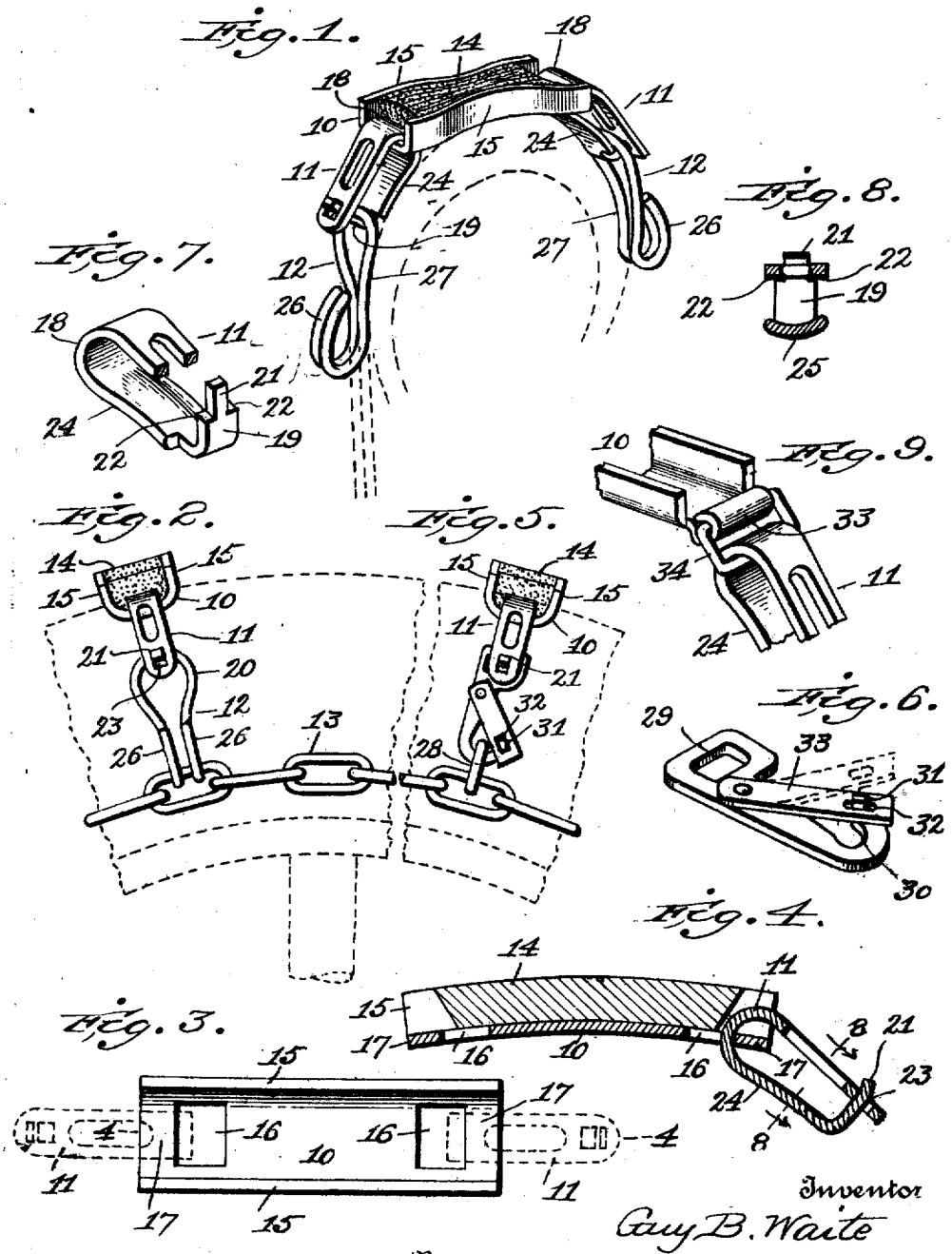

GUY B. WAITE, OF NEW YORK, N. Y.

ANTISKID DEVICE FOR TIRES.

1,343,293.  Specification of Letters Patent.  Patented June 15, 1920.

Application filed December 18, 1917. Serial No. 207,789.

*To all whom it may concern:*

Be it known that I, GUY B. WAITE, a citizen of the United States, residing at New York, in the county of New York and State of New York, have invented certain new and useful Improvements in Antiskid Devices for Tires, of which the following is a specification.

This invention relates to improvements in transverse anti-slipping members for anti-skid chains, and has for its objects, to provide a transverse member which is adapted for detachable connection with the side chain members or other retaining devices, and including an anti-slipping link provided with connecting links at each end which are also adapted for detachable connection with each other and the anti-slipping link.

A further object, is to provide a transverse member which is strong and effective in operation, and one which will stand the severe wear and strains that are usually imposed upon cross-chains, and at the same time avoid injury to the tire.

These and other objects hereinafter set forth, are attained by the means illustrated in the accompanying drawing, in which—

Figure 1, is a perspective view of one of the cross members, and showing the cross-section of a tire in dotted lines.

Fig. 2, shows in dotted lines a side elevation of a portion of a tire, and having one of the cross members mounted thereon and connected to a side chain.

Fig. 3, is a plan view of one of the anti-slipping pad holders.

Fig. 4, is a longitudinal sectional view on the line 4—4 of Fig. 3 showing the anti-slipping pad in position, and one of the connecting links in section.

Fig. 5, is a similar view to Fig. 2, showing a modified form of connecting hook.

Fig. 6, is a detail perspective view of the connecting hook shown in Fig. 5.

Fig. 7, is a detail perspective view of one of the intermediate connecting links.

Fig. 8, is a transverse section on the line 8—8 of Fig. 4, and

Fig. 9, is a modified form of connection between the intermediate and the anti-slipping member.

Similar reference numerals in all of the figures of the drawing, designate like parts.

Referring to Figs. 1 to 4 inclusive, 10 designates the anti-slipping pad holder, having the intermediate links 11 connected to each end thereof, and said links 11 having the hook links 12 connected therewith and to the usual side chains 13 of an anti-skid device.

Holder 10 is preferably a metallic channeled member which is adapted to lie transversely of the tire, and is provided with a friction block or anti-slipping pad 14 which is retained within the holder by the pressure of the sides 15, preferably by bending said sides inwardly toward each other intermediate their ends, as clearly shown in Fig. 1 of the drawing. Friction block 14 is formed with any suitable material, but is preferably constructed of rubber coated fabric layers which are united together and positioned in the holder to present their edges to the roadway and to extend longitudinally of the holder. In the bottom of the holder 10 adjacent its ends, are formed the openings 16, thereby providing the cross-pieces 17 upon which the intermediate wide links 11 are mounted. The tire engaging side of holder 10 is preferably convexed slightly in cross-section, so that it can tilt on the surface of the tire, and the inner side being thus rounded, prevents cutting of the tire.

Wide links 11 are preferably constructed from flat metal which is bent intermediate its ends to form the curved end 18, that engages over the cross piece 17, and forming outer and inner sides, the inner side being narrowed at its end and bent at right angles to form the end piece 19 which is engaged by the loop 20 of the hook-link 12. End piece 19 is provided with a tongue 21 which is narrower than the piece 19, thereby forming shoulders 22, against which the outer side of the link 11 engages, thereby preventing further inward movement of said outer side relative to the inner side. Said outer side is prevented from bending outwardly, by passing the tongue 21 through an opening 23 in the outer side adjacent to its outer end. The inner side of link 11 is curved longitudinalty to conform to the shape of the tire, as indicated at 24, and is also curved transversely to provide a convex surface 25 which will allow the link 11 to tilt on the surface of the tire in the same manner as does the holder 10.

Hook links 12 are preferably formed of heavy wire or rod iron which is bent to form the loop 20, and the free ends are bent backwardly to form the double hook-end 26, which engages a link of the side chains 13. Hook links 12 are also curved longitudinally to conform to the surface of the tire, as shown at 27.

Links 11 are preferably narrower than the openings 17 in the holders 10, so that said links will have clearance for side play, and loops 20 of the hook links 12 are formed considerably wider than the end pieces 19 of the links 11, so that side play is provided for these parts. Thus is provided an anti-slipping tread block held in position upon the tread of the tire by a plurality of links at each side, the tire contacting sides of said links being shaped to conform with the surface of the tire, and said links being shaped and proportioned to provide a universal free movement at their connections, that is, they not only are connected to enable them to remain in contact with the tire when the same is compressed, but they are also bodily movable sidewise and to some degree endwise, which will prevent the wearing of the links at the connecting points, it having been discovered by experimenting, that cross links when used upon the road have a peculiar action, due to the pounding imposed upon the tread block, this action cutting and wearing away the rear side of each succeeding link, for the reason that the tread block is forced backwardly when it strikes the road, and unless there is a backward play or clearance as in the present device, the rear sides of the connecting parts will grind together and finally break. This serious defect is cured in the present invention, and the backward or sidewise movements of the links are facilitated by the convex bearing sides of the tread block and the wide connecting link.

Tread block or holder 10 can be used with or without the anti-slipping block 14. When used without the anti-slipping means it is cheaper to construct, and is more adapted for use in snow, mud or slush, owing to its deeper grip, but when used with the anti-slipping block, it promotes smoother running, less noise, and is more effective as a non-skid on smooth and wet roadways. Furthermore, the anti-slipping block has another important function, in that it serves as a cushion for the curved end of the link 11, as clearly shown in Fig. 4 of the drawing, where it is seen that the ends of the anti-slipping block project over the openings 16 in close relation to the link 11, thus preventing this end of the flat-link from contacting with the rear wall of the opening, thereby preventing wearing of this part of the link.

Wide link 11 is particularly constructed to prevent wear to itself or its connecting parts. Its shoulders 22 on the end piece, retain the free end of the outer side a considerable distance from the inner side, so that the loop of the link 12 will never be bound tight to prevent its free movement. In forming the shoulders 22, the relatively narrow tongue is provided, the same being comparatively easy to bend over the edge of the opening 23 to retain the link closed, and at the same time, said shoulders provide the relatively wide end piece 19, which is capable of withstanding the severe pulls and jerks to which the link are subjected.

Both the wide links 11, and the hook-links 12, are openable under sufficient prying force, so that they can be replaced with new links when desired, or an entire new cross chain can be substituted for an old one through the openable ends of the hook links. It is intended to manufacture and sell these improved cross-chains independent of the side chains or any other holding means, therefore to adapt them to different diameters of tires, the free ends 26 of the hook-links, are preferably left straight, as indicated in dotted lines in Fig. 1, so that short or long hooks can be formed depending upon the size of the tire.

In Figs. 5 and 6, is shown a modified form of connecting or hook-link, the same being better adapted to attach the cross-chains to a holding means which has a connecting loop lying edgewise to the tire, as for instance, the short loop 28, shown in Fig. 5. This modified form of hook-link is preferably constructed of flat metal, and is formed with a closed loop 29 at one end, and an open hook 30 at its opposite end, the terminal of said hook 30 being bent outwardly to form a tongue 31, which is adapted to engage through an opening 32 in a spring latch 33, which is pivoted at its opposite end to the body of the link. This construction forms an effective, detachable hook-link, which is not likely to become unfastened accidentally.

In Fig. 9 is shown a modified manner of connecting the wide link 11 to the holder or tread block. In this form, instead of the opening 16, both ends of the tire engaging side of the holder are formed into closed loops 33 in each of which is pivoted one side of short loops 34, the opposite side of said loops 34 being adapted to support the curved end of the links 11.

From the above description, it will be seen that a cross-chain is provided, which embodies a tiltable and slidable tread block, having tiltable and slidable wide links at each end, and hook-links connected to said flat links in a manner to also have a free movement, both said flat and hook links being openable outwardly from the tire, or in a direction transversely of the tire, or at right angles to the pulling strains imposed upon the cross-chains when the tread blocks engage the roadway.

It will be observed, that after the loops 20 of the hook-links are formed and secured around the end pieces 19, the sides of the links are brought into close relation to each other, so that when the anti-slipping device is placed upon the market with the side members of the hook-links straight, that is without the hooks 26 being formed, said hook-links cannot become accidentally detached and lost from the links 11.

Having thus fully described the invention, what is claimed is:—

1. A transverse member for a tire anti-skid device, comprising a tread-block, a sheet-metal link connected to each end of said tread-block, each of said links being formed with a wide inner-side having a relatively narrow end-piece at one end, and an outer-side connected to the inner side with a wide curve at one end and at its other end to said end-piece by an integrally formed locking and spacing means, said inner and outer-sides being spaced apart their entire length substantially the width of said curved end and forming an open loop free from obstructions between its ends, whereby said link can have a free endwise movement in either direction, said locking and spacing means embodying a tongue formed integrally with said narrow end-piece, and an opening formed in the end of said outer-side to receive said tongue which is adapted to be bent over the edge of said opening to lock the link closed, and means for detachably securing said links to the side members of the anti-skid device.

2. A transverse member for a tire anti-skid device, comprising a tread-block, a sheet-metal link connected to each end of said tread-block, each of said links being formed with a wide inner-side having a relatively narrow end-piece at one end, and an outer side connected to the inner-side with a wide curve at one end and at its other end to said end-piece by an integrally formed locking and spacing means, said inner and outer-sides being spaced apart their entire length substantially the width of said curved end and forming an open loop free from obstructions between its ends, whereby said link can have a free endwise movement in either direction, said locking and spacing means embodying a relatively narrow tongue formed on the end of said narrow end-piece to provide shoulders at the base of the tongue, and an opening formed in the end of said outer-side to receive said tongue which is adapted to be bent over one edge of said opening to lock the outer-side against said shoulders and retain the link closed.

In testimony whereof I affix my signature.

GUY B. WAITE.